Patented Jan. 15, 1935

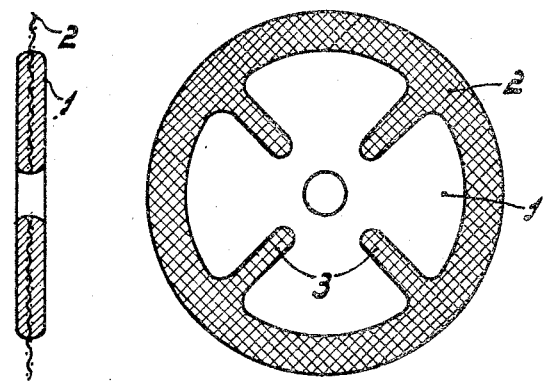
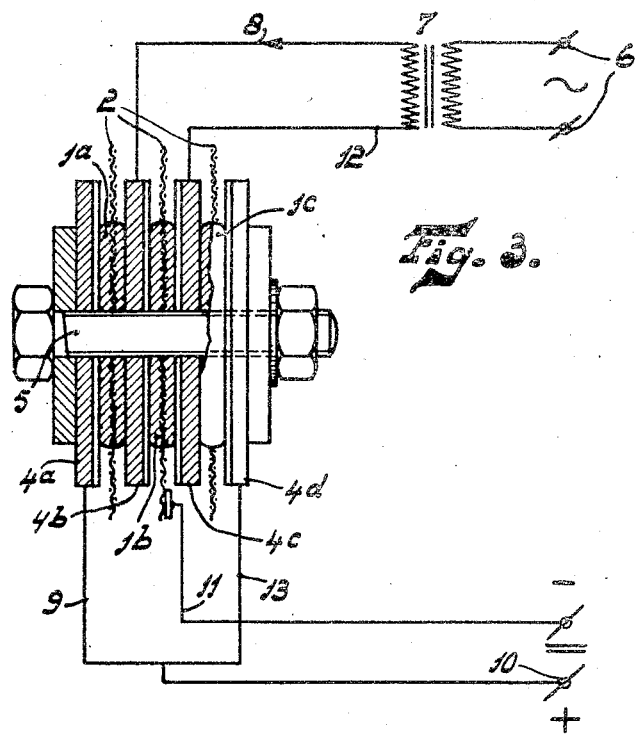

1,988,116

UNITED STATES PATENT OFFICE 1,988,116

ELECTRODE SYSTEM

Hendrik Emmens and Willem Christiaan van Geel, Eindhoven, Netherlands, assignors to Radio Corporation of America, a corporation of Delaware Application November 25, 1931, Serial No. 577,363
In the Netherlands October 4, 1930

7 Claims. (Cl. 175—366)

The invention relates to an electrode system consisting of two electrodes of mutually different materials which are separated by a thin intermediate layer of a third material.

Such systems are often utilized as rectifiers on account of their unsymmetrical conductivity. Besides, they are sometimes employed as condensers for smoothing a pulsatory direct current while different other applications are possible. The electrodes mostly have the shape of plates or strips. One of the electrodes often consists of metal and in this case the thin intermediate layer may be formed by a film of oxide on the said metal plate. The other electrode frequently consists of a material which cannot easily be brought into the shape of plates such, for example, as phosphorus. In this case the electrodes are mostly manufactured by reducing the constituent substances to powder and by pressing this powder, if desired with the addition of a binder, into the required shape. The plates thus produced must however still be comparatively thick because they are else very fragile and easily crumble. The thickness of these plates firstly entails the inconvenience that a system built up from a plurality of cells occupies a comparatively large room. Secondly, the resistance of the substance constituting the electrode in question, is generally rather high so that a thick plate of this substance has a high resistance. Besides, the heat produced in the plate on the passage of the current cannot easily be dissipated to the outside.

According to the invention, these drawbacks are removed by forming the electrodes consisting of powdery material with the aid of a framework of solid material onto which the substance concerned is pressed.

Thus one obtains electrodes which are rigid and which nevertheless may be constructed as thin plates which therefore have a comparatively slight resistance. The plates may even be shaped and bent in various ways without any risk of breakage.

The framework preferably consists of conducting material owing to which consequently the resistance of the electrode is still further reduced. In a favourable form of execution one of the electrodes or both electrodes consist of powder pressed on to perforated metal, for example, on metal gauze, for gauze shows in particular the property of causing the powder pressed thereon to adhere particularly well so that in a very simple manner a rigid unit is obtained.

It may be advantageous to cause the framework having the powder pressed on it, to project beyond the edges of the plate, inter alia because in this manner a satisfactory cooling of the plate is ensured. In fact, the gauze conducts the heat from the interior of the plate to the outside where the heat is given off by conduction and radiation to the surroundings. Besides, a framework protruding from the electrode may be utilized for the connection of the supply wires. Against the plate of powdery material has hitherto frequently been pressed a plate of other material, for example of lead, exclusively with the intention of establishing a conductive connection between this electrode and the supply wire. Such plates may now be entirely omitted.

In order to improve the cooling still more the electrode may be provided with incisions. With the known plates this would be impossible because they easily break.

The invention is schematically elucidated in the accompanying drawing in which

Figure 1 shows a cross-section of an electrode according to the invention.

Figure 2 is a corresponding front view.

Figure 3 represents a system for rectifying alternating current, built up from some cells comprising each an electrode according to the invention.

In the figures the electrode proper is denoted by 1 and the metal gauze by 2. The metal gauze is constituted, for example, by copper gauze.

The thickness of the plate 1 must not be considered to be a standard for the real thickness of the plate. This thickness may be considerably smaller than the thickness shown in the drawing.

As will be seen from Figure 2, the electrode 1 is provided with incisions 3 which facilitate the cooling. Besides, it appears from this figure that the metal gauze projects some distance beyond the electrode proper 1, which is also conductive to the cooling. The electrode pressed from powdery material may consist not only of phosphorus as already mentioned but also of many other materials such, for example, as a mixture of copper iodide and barium dioxide, of a mixture of cuprous sulphide and cupric sulphide, of lead sulphide, molybdenum sulphide, tungsten sulphide, iron sulphide or of a mixture of these substances. The invention is furthermore of importance for all those substances which in the form of powder are pressed to form an electrode.

Figure 3 represents a plurality of cells the unsymmetrical conductivity of which is utilized for rectifying an alternating current. Four metal plates 4 consisting, for example, of zirconium coated with a layer of zirconium oxide, together with three electrodes pressed on copper gauze and consisting, for example, of a mixture of copper iodide and iodine, are slid on a bolt 5 and forced against each other. As appears from the drawing, these cells are inserted into the known Grätz-circuit arrangement with which both waves of the alternating current are rectified while each time two rectifier cells are traversed in series by the current.

It distinctly appears from the drawing that with the construction according to the invention a very simple unit is obtained owing to the fact that separate plates for establishing the conductive connection between the supply wires and the electrodes 1 can be dispensed with. The supply wire leading to the electrode 1 placed in the middle is connected to the copper gauze enclosed in this electrode. The alternating current is supplied to alternating current terminals 6 and brought to the desired voltage with the aid of a transformer 7. During one half wave the current flows from 7 through 8 to the plate 4b, from this plate through the plate 1a to the plate 4a, through 9 to the connecting terminals 10 for the direct-current load, then via 11 to the connecting point of the copper gauze of the plate 1b and from this gauze through the plate 4c and the conductor 12 back to the transformer 7. The current cannot flow from the plate 4b via 1b directly to 4c because, due to the unsymmetrical conductivity of the rectifier cells, the current can never flow from a plate 4 through the oxide film to a plate 1 but flows in opposite direction.

During the second half-wave of each cycle the current flows from 7 via 12, 4c, 1c, 4b, 13, direct-current terminals 10, 1b, 4b and 8 back to 7. The direct-current load connected to the terminals 10 consequently takes up a pulsatory direct current. It is evident that the framework of the electrode may have very different shapes. A plate having a rough surface or provided with incisions may be used as such. The framework may also take the form of a simple reinforcement of the plate pressed from powder and consist in this case, for example, of a plurality of rods which are independent of one another or are connected to one another at some points. Besides, use may be made of a plurality of independent or mutually connected frameworks without departing from the principle of the invention.

What we claim is:—

1. An electrode system formed by two electrodes of different materials separated by a thin intermediate layer of uni-laterally conducting material wherein one of the electrodes is made up of compressed powdered electrode substance and a binder pressed on a conducting framework, the compressed material being placed as regards the framework so that said framework projects beyond the edges of the compressed electrode material and at least one incision through a portion of the compressed material to facilitate heat dissipation from the interior portions of the electrode.

2. In a system in accordance with the next preceding claim wherein the compressed electrode material is formed so as to be provided with a plurality of said incisions arranged substantially radially with respect to the geometrical center of the electrode.

3. In the manufacture of a rectifier unit having two dissimilar material electrodes separated by a uni-laterally conducting medium, the method which comprises forming one of the electrodes of a powdered electrode material and a binder formed about a supporting conducting screen by pressure.

4. The method of constructing electrodes for rectifier units, condensers and the like which comprises forming a supporting mesh of conducting material, moulding powdered electrode material and a binder to a suitable thickness about at least a portion of the supporting mesh and forming at least one incision through a portion of the moulded material to facilitate heat dissipation from the interior portions of the electrode.

5. An electrode system formed by two electrodes of different materials separated by a thin intermediate layer of a third material wherein at least one of the electrodes is made up of powdery electrode substance and a binder pressed on a conducting framework constructed of metal gauze.

6. A dry cell rectifier for alternating current comprising, two electrodes of different materials separated by a thin intermediate layer of a third material, one of said electrodes comprising a mixture containing copper iodide and iodine pressed upon a metallic gauze disc, said other electrode being composed of zirconium.

7. A dry cell rectifier of the type described in claim 6 wherein the other electrode is composed of zirconium and said intermediate layer is composed of zirconium oxide.

HENDRIK EMMENS.
WILLEM CHRISTIAAN VAN GEEL.